United States Patent
McBride et al.

(10) Patent No.: US 8,794,862 B2
(45) Date of Patent: Aug. 5, 2014

(54) SEAL FOR SEALING AN AXIAL SPACE

(75) Inventors: Tadd McBride, Riverton, UT (US);
Christopher Hughes, Chicago, IL (US)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/222,872

(22) Filed: Aug. 31, 2011

(65) Prior Publication Data
US 2012/0051834 A1 Mar. 1, 2012

Related U.S. Application Data

(60) Provisional application No. 61/378,711, filed on Aug. 31, 2010.

(51) Int. Cl.
*F16J 15/32* (2006.01)

(52) U.S. Cl.
USPC .......................................................... 403/288

(58) Field of Classification Search
USPC ............ 403/50, 51, 134, 288, 151, 152, 157; 277/551, 353, 562
See application file for complete search history.

(56) References Cited

U.S. PATENT DOCUMENTS

| | | | | |
|---|---|---|---|---|
| 2,411,214 A * | 11/1946 | Keech | ........................... | 403/150 |
| 2,994,571 A * | 8/1961 | Peras | ............................ | 277/437 |
| 3,563,556 A * | 2/1971 | Scott | ............................. | 277/346 |
| 4,960,341 A * | 10/1990 | Aarre et al. | ...................... | 403/24 |
| 6,241,252 B1 * | 6/2001 | Jump et al. | ..................... | 277/353 |
| 7,770,897 B2 * | 8/2010 | Berdichevsky | ............... | 277/551 |
| 2006/0071430 A1 * | 4/2006 | Downes et al. | ............... | 277/549 |
| 2006/0290067 A1 * | 12/2006 | Dahlheimer | .................. | 277/345 |
| 2007/0166096 A1 * | 7/2007 | Lim et al. | ........................ | 403/50 |
| 2008/0237992 A1 * | 10/2008 | Brock et al. | .................. | 277/307 |
| 2009/0261650 A1 * | 10/2009 | Dahlheimer | .................. | 305/105 |

* cited by examiner

*Primary Examiner* — Joshua Kennedy
(74) *Attorney, Agent, or Firm* — Bryan Peckjian; SKF USA Inc. Patent Department

(57) ABSTRACT

A seal is for sealing an axial space between first and second axially-spaced members, the first member having a radial surface and the second member having an outer circumferential surface. The seal includes an annular body having inner and outer circumferential surfaces and first and second axial ends, a radial sealing surface proximal to the first end to sealingly engage with the first member radial surface, and a circumferential sealing surface proximal to the second end to sealingly engage with the second member outer surface. At least a portion of the seal body extends circumferentially about and encloses the axial space. The seal may be incorporated in a joint assembly for a linkage having first and second links, the assembly including a shaft coupled with the first link and a boss coupled with the second link, receiving the shaft, and defining an axial space in which the seal is disposed.

13 Claims, 5 Drawing Sheets

SEAL FOR SEALING AN AXIAL SPACE

This application claims priority to U.S. provisional patent application No. 61/378,711, filed Aug. 31, 2010, the entire contents of which are incorporated herein by reference.

The present invention relates to seals, and more particularly to seals for sealing an axial space between joint components of a linkage.

Joint assemblies of linkages, such as those used in a lifter mechanism of construction vehicles (e.g., a front end loader), are known and typically include a pin pivotably or rotatably connecting first and second links or pairs of links. It is often necessary to provide one or more shims between one component, such as a first link, and a second component, such as a boss connected with a second link, to "occupy" an axial space between the components so as to prevent undesired relative axial displacement. Particularly when one or more components is radially displaceable relative to other components (e.g., pin movable radially within the boss), there is the chance of contaminants entering the linkage through the axial space.

SUMMARY OF THE INVENTION

In one aspect, the present invention is a seal for sealing an axial space between first and second members spaced apart along an axis, the first member having a generally radial surface and the second member having an outer circumferential surface. The seal basically comprises a generally annular seal body having inner and outer circumferential surfaces and opposing first and second axial ends. The body has a radial sealing surface proximal to the first axial end and configured to sealingly engage with the first member radial surface and a circumferential sealing surface proximal to the second axial end and configured to sealingly engage with the second member outer surface. At least a portion of the seal body extends circumferentially about and encloses the axial space.

In another aspect, the present invention is a joint assembly for a linkage, the linkage including at least one first link and a second link, the at least one first link having a radial surface. The joint assembly comprises a shaft coupled with the at least one first link and having an outer circumferential surface and a boss coupled with the second link and having an inner surface defining a central bore, at least a portion of the shaft being disposed within the bore, an outer circumferential surface, and at least one radial end surface spaced from the first link radial surface so as to define an axial clearance space. Further, a seal is configured to seal the axial space and including a generally annular seal body having inner and outer circumferential surfaces and opposing first and second axial ends. The body has a radial sealing surface proximal to the first axial end and configured to sealingly engage with the first link radial surface and a circumferential sealing surface proximal to the second axial end and configured to sealingly engage with the boss outer surface. At least a portion of the seal body extends circumferentially about and encloses the axial space.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
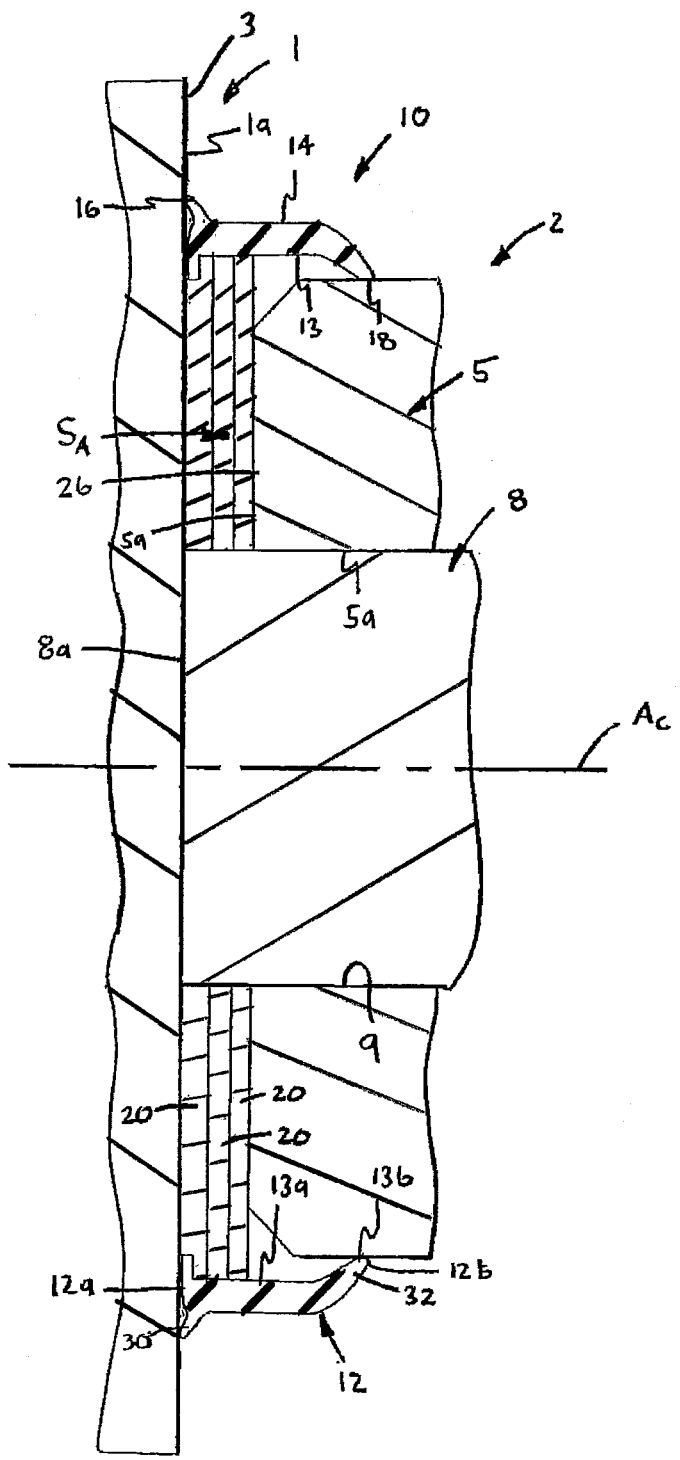
FIG. 1 is an axial cross-sectional view through a joint assembly for a linkage, including a seal in accordance with the present invention.
Figure 2:
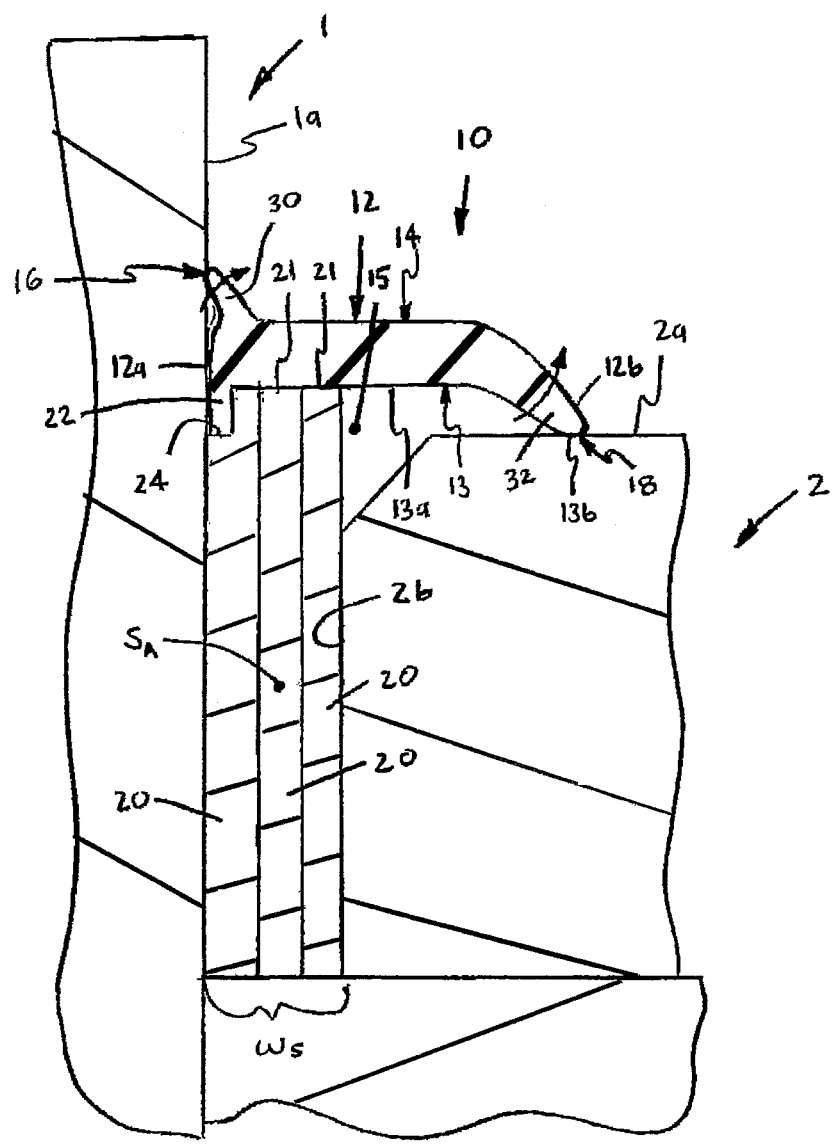
FIG. 2 is an enlarged view of an upper portion of FIG. 1.

Certain terminology is used in the following description for convenience only and is not limiting. The words "right", "left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-7 a seal 10 for sealing an axial space $S_A$ between first and second members 1, 2 spaced apart along a central axis $A_C$. The first member 1 is preferably a first link 3 of a joint assembly 4 and has a generally radial surface 1a and the second member 2 is preferably a boss 5 connected with a second link 6 and has an outer circumferential surface 2a and an outside diameter OD, the joint assembly 4 being described in further detail below. The seal 10 basically comprises a generally annular seal body 12 having inner and outer circumferential surfaces 13, 14, opposing first and second axial ends 12a, 12b, a radial sealing surface 16 proximal to the first axial end 12a and a circumferential sealing surface 18 proximal to the second axial end 12b. The radial sealing surface 16 is configured to sealingly engage with the first member radial surface 1a and the circumferential sealing surface 18 is configured to sealingly engage with the second member outer surface 2a, with at least a portion of the seal body 12 extending circumferentially about and enclosing the axial space $S_A$. Further, the seal body 12 may be formed as a solid ring or my be axially "split" to facilitate assembly about the outer surface of the second member 2, in which case the seal assembly 10 further includes means to connect the body ends (e.g., an adhesive, tabs and fasteners, etc.—not shown).

In many applications, the width $w_S$ (FIG. 2) of the axial space $S_A$, i.e., the distance between the first body radial surface 1a and a second body end surface 2b, is sufficiently large or great such that one or more shims 20 are disposed within the axial space $S_A$ between the first and second members 1, 2.

Figure 3:
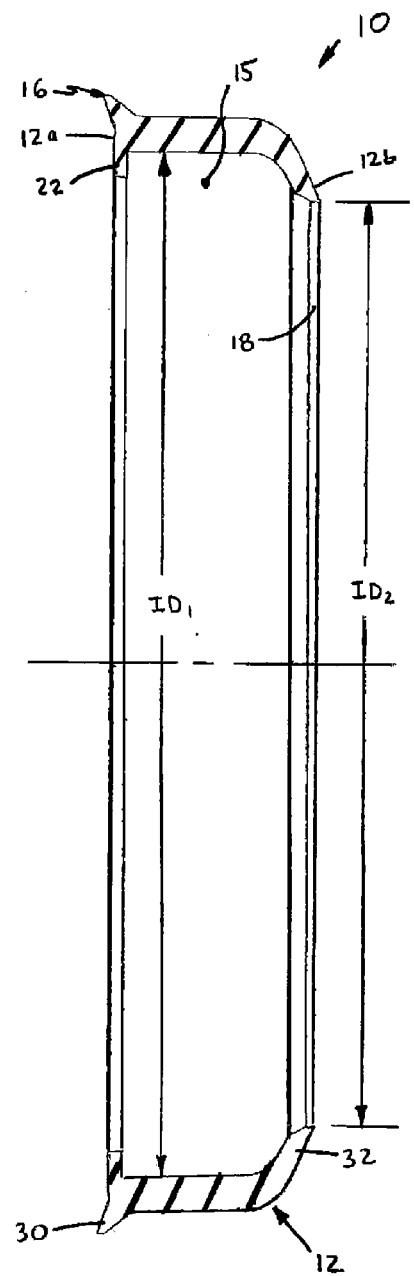
FIG. 3 is an axial cross-sectional view through one construction of the seal.
Figure 4:
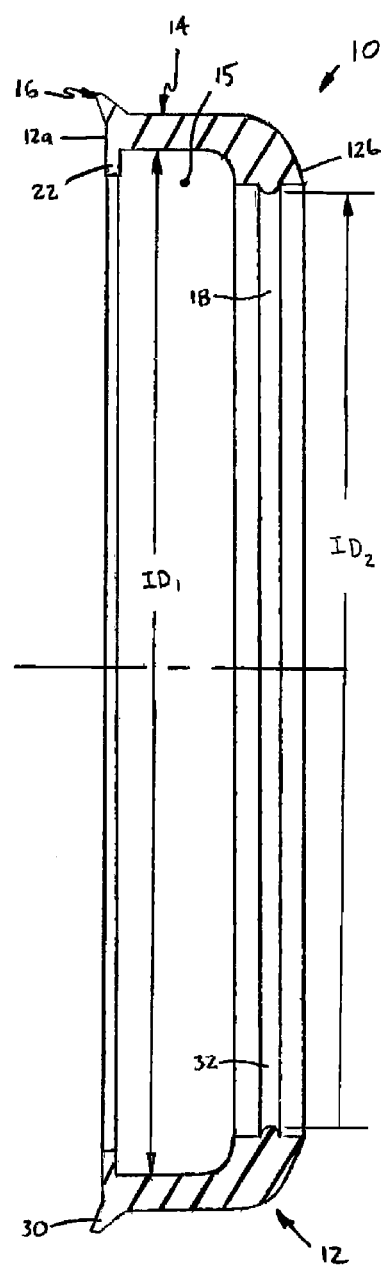
FIG. 4 is an axial cross-sectional view through another construction of the seal.

The shim(s) 20 are provided to substantially occupy the axial space $S_A$ and thereby prevent relative axial displacement between the members 1, 2. As such, the seal body 12 is preferably formed such that the inner surface 13 includes axially spaced first and second inner surface sections 13a, 13b; the first inner surface section 13a being located adjacent to the first axial end 12a and defining a shim cavity 15 and the second inner surface section 13b is located adjacent to the second axial end 12b and includes the circumferential sealing surface 18. The shim cavity 15 is configured (i.e., sized and shaped) to receive the at least one shim 20 and preferably a plurality of the shims 20, as discussed below. More specifically, the seal first inner surface section 13a has a first inside diameter $ID_1$ and the seal second inner surface section 13b has a second inside diameter $ID_2$, as indicated in FIGS. 3 and 4. The first inside diameter $ID_1$ is greater than the second inside diameter $ID_2$ and the second inside diameter $ID_2$ is lesser than the second member outside diameter OD (FIG. 2) such that the circumferential sealing surface 18 frictionally engages with the second body outer surface 2a. Further, the seal first inner surface section 13a is sized to frictionally engage with an outer circumferential surface 21 of the at least one shim 20 and preferably of each of the plurality of shims 20, so as to axially retain the seal body 20.

Preferably, the seal body 12 further includes at least one engagement tab or projection 22 located adjacent to the body first axial end 12a and extending generally radially inwardly from the body first inner surface section 13A. The projection is configured to engage with the at least one shim 20 so as to generally axially retain the seal body with respect to the central axis $A_C$. More specifically, at least one shim 20 is formed or fabricated to include at least one pocket 24 extending generally radially inwardly from the shim outer surface 21 and configured to receive the tab/projection 22, so as to thereby substantially prevent axial displacement of the seal body 12 and thus also maintain sealing engagement between the seal body radial sealing surface 16 and the first member radial surface 1a. Further, the seal projection(s) 22 may be formed in any appropriate manner, such as for example, one or more separate arcuate tabs, a single annular shoulder extending circumferentially about the axis AC, etc., or the seal 10 may be formed without any projection/tab and instead only frictionally engage with the shim(s) 20.

Figure 5:
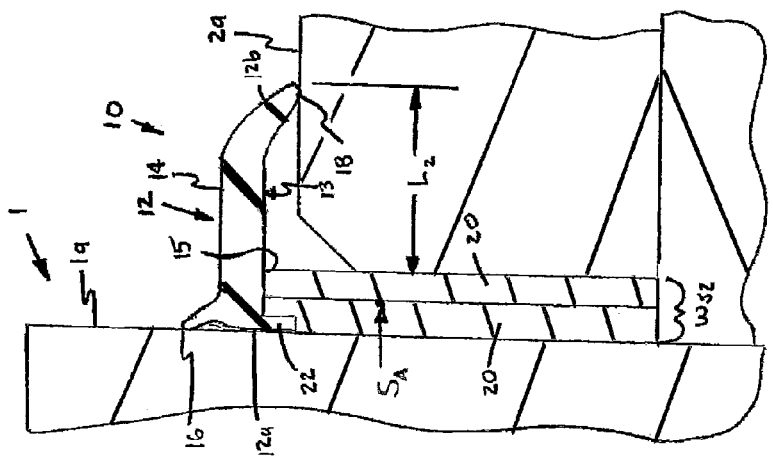
FIG. 5 is a broken-away, cross-sectional view through an upper portion of the joint assembly, shown with three shims.
Figure 6:
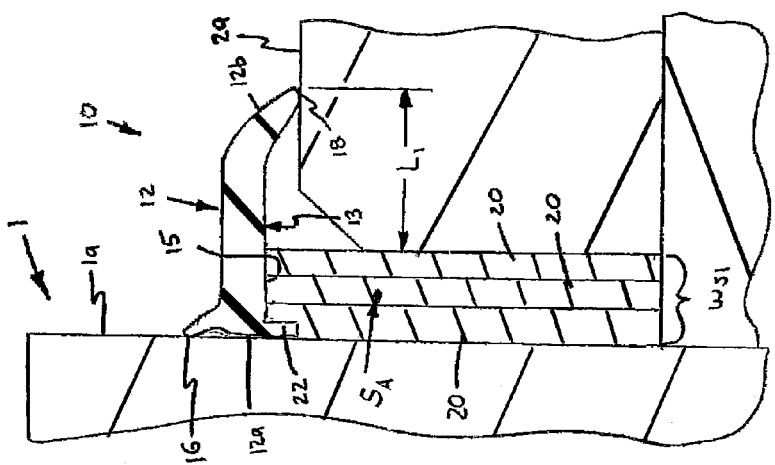
FIG. 6 is a broken-away, cross-sectional view through an upper portion of the joint assembly, shown with two shims.

Referring to FIGS. 5 and 6, the seal body 12 is formed such that the seal cavity 15 is capable of receiving differing numbers of shims 20, depending on number required to "fill" the actual width $w_S$ of the axial space $S_A$, so that the seal 10 is capable of functioning in a variety of different applications. In other words, the shim cavity 20 is configured to receive a first number $N_1$ of shims 20 (e.g., three shims) when the axial space $S_A$ has a first width $w_{S1}$, such that the seal body inner surface 13A overlaps a first length $L_1$ of the second member outer surface 2a, as shown in FIG. 5, and to alternatively receive a second number $N_2$ of shims 20 (e.g., two shims) when the axial space $S_A$ has a second width $w_{S2}$, such that the body inner surface 13A overlaps a second length $L_2$ of the second member outer surface 2a, as depicted in FIG. 6. The first number $N_1$ of shims 20 is greater than the second number $N_2$ of shims 20 such that the second outer surface length $L_2$ is greater than the first outer surface length $L_1$. Thus, the seal 20 is capable of accommodating differing numbers of shims 20 while sealing against both the first member radial surface 1a and the second member outer circumferential surface 2a, and will overlap a greater or lesser length of the second member outer surface 2a depending on the actual number of shims 20 necessary to "fill" the space $S_A$.

Referring to FIGS. 1-4, the seal body 12 preferably includes a first annular projection 30 extending generally axially from the seal body first end 12a and a second annular projection 32 extending generally radially inwardly from the seal body inner surface 13. The first annular projection 30 provides at least a portion of the radial sealing surface 16 and the second annular projection 32 provides at least a portion of the circumferential sealing surface 18. Each projection 30, 32 may be formed generally as a cantilever-like portion of the body 12, such that each cantilever projection 30, 32 is bended or deflected during installation to provide a sealing pressure against the member surfaces 1a, 2a, as indicated by arrows in FIG. 2. However, the seal body first end 12a or/and the seal body inner surface 13 may be formed without a projection, such that a radial surface of the body end 12a or/and a portion of body inner surface 13 directly contacts and sealingly engages with the first and second members 1, 2, respectively.

Figure 7:
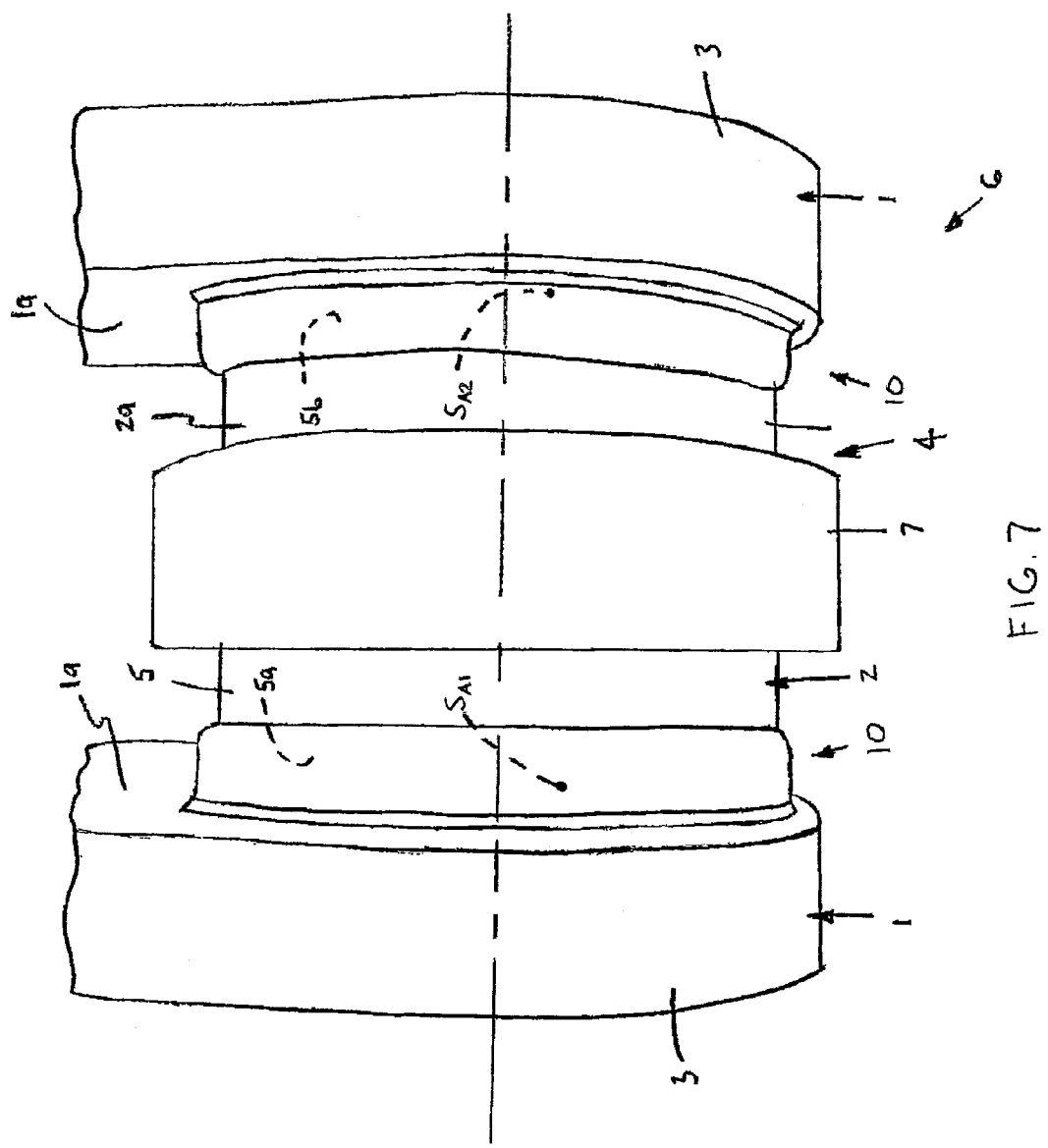
FIG. 7 is a broken-away, perspective view of the linkage, shown with two seals.

Referring now to FIGS. 1 and 7, as discussed above, the seal 10 is preferably incorporated into a joint assembly 4 for a linkage 6, the linkage 6 including at least one and preferably a pair of first links 3, each providing a first member 1, and a second link 7 coupled with the boss 5, which provides the second member 2. A shaft 8 has opposing ends 8a (only one shown) each coupled with a separate one of the first links 3, and the boss 5 has an inner surface 5a defining a central bore 9, at least a portion of the shaft 8 being disposed within the bore 9. Such a linkage 6 preferably includes two seals 10 of the present invention, each sealing a separate axial space $S_{A1}$, $S_{A2}$, as indicated in FIG. 7, between one end 5a or 5b of the boss 5 and the proximal first link 3. However, the seal 10 of the present invention may be utilized in any other application where it is desired to seal an axial space between first and second members.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:
1. An assembly comprising:
first and second members spaced apart along an axis so as to define an axial space, the first member having a generally radial surface and the second member having an outer circumferential surface and a radial end surface extending radially to the outer circumferential surface, the second member being one of coupled with the first member and disposed about a third member coupled with the first member;
a seal for sealing the axial space and including a generally annular seal body having inner and outer circumferential surfaces, opposing first and second axial ends, a radial sealing surface proximal to the first axial end and configured to sealingly engage with the first member radial surface, and a circumferential sealing surface proximal to the second axial end and configured to sealingly engage with the second member outer surface such that the seal body encloses the second member radial end surface, at least a portion of the seal body extending circumferentially about and enclosing the axial space, the seal body being configured to be non-contactable with the enclosed second member radial end surface; and
at least one generally annular shim disposed within the axial space between the first and second members;

wherein the seal body inner surface includes axially spaced first and second inner surface sections, the first inner surface section being located adjacent to the first axial end and defining a shim cavity for receiving the at least one shim and the second inner section being adjacent to the second axial end and including the circumferential sealing surface, the seal shim cavity being sized to receive a plurality of the shims and configured to receive a first number of shims such that the seal body inner surface overlaps a first portion of the second member outer surface and to alternatively receive a second number of shims such that the body inner surface overlaps a second portion of the second member outer surface, the first number of shims being greater than the second number of shims such that the second outer surface portion is greater than the first outer surface portion.

2. The assembly as recited in claim 1 wherein the first inner surface section is sized to frictionally engage with an outer circumferential surface of the at least one shim.

3. The assembly as recited in claim 1 wherein the second member outer surface has an outside diameter, the seal first inner surface section has a first inside diameter and the seal second inner surface section has a second inside diameter, the first inside diameter being greater than the second inside diameter and the second inside diameter being lesser than the second member outside diameter such that the circumferential sealing surface frictionally engages with the second body outer surface.

4. The assembly as recited in claim 1 wherein the seal body includes at least one engagement projection extending generally radially inwardly from the body first inner surface section and configured to engage with the at least one shim so as to generally prevent displacement of the seal body along the axis.

5. The assembly as recited in claim 1 wherein the seal body includes a first annular projection extending generally axially from the seal body first end and providing at least a portion of the radial sealing surface and a second annular projection extending generally radially inwardly from the seal inner surface and providing at least a portion of the circumferential sealing surface.

6. A joint assembly for a linkage, the linkage including at least one first link and a second link, the at least one first link having a radial surface, the joint assembly comprising:
a shaft coupled with the at least one first link and having an outer circumferential surface;
a boss coupled with the second link and having an inner surface defining a central bore, at least a portion of the shaft being disposed within the bore, an outer circumferential surface, and at least one radial end surface spaced from the first link radial surface so as to define an axial clearance space; and
a seal configured to seal the axial space and including a generally annular seal body having inner and outer circumferential surfaces, opposing first and second axial ends, a radial sealing surface proximal to the first axial end and configured to sealingly engage with the first link radial surface, and a circumferential sealing surface proximal to the second axial end and configured to sealingly engage with the boss outer surface such that the seal body encloses the boss radial end surface, at least a portion of the seal body extending circumferentially about and enclosing the axial space, the seal body being configured to be non-contactable with the enclosed boss radial end surface;
wherein at least one generally annular shim is disposed within the axial space between the first link and the boss, the seal body inner surface includes axially spaced first and second inner surface sections, the first inner surface section being located adjacent to the first axial end and defining a shim cavity for receiving the at least one shim and the second inner section being adjacent to the second axial end and including the circumferential sealing surface, the seal shim cavity being sized to receive a plurality of the shims and configured to receive a first number of shims such that the seal body inner surface overlaps a first portion of the boss outer surface and to alternatively receive a second number of shims such that the body inner surface overlaps a second portion of the boss outer surface, the first number of shims being greater than the second number of shims such that the second outer surface portion is greater than the first outer surface portion.

7. The joint assembly as recited in claim 6 wherein the at least one first link includes a pair of first links spaced apart along the axis, the shaft having opposing axial ends each coupled with a separate one of the pair of second links, and the boss being disposed between the pair of links.

8. The seal as recited in claim 6 wherein the first inner surface section is sized to frictionally engage with an outer circumferential surface of the at least one shim.

9. The seal as recited in claim 6 wherein the number of the plurality of shims is selected so as to substantially occupy the axial clearance space between the first link and the boss.

10. The seal as recited in claim 6 wherein the second member outer surface has an outside diameter, the seal first inner surface section has a first inside diameter and the seal second inner surface section has a second inside diameter, the first inside diameter being greater than the second inside diameter and the second inside diameter being lesser than the second member outside diameter such that the circumferential sealing surface frictionally engages with the second body outer surface.

11. The seal as recited in claim 6 wherein the seal body includes at least one engagement projection extending generally radially inwardly from the body first inner surface section and configured to engage with the at least one shim so as to generally prevent displacement of the seal body along the axis.

12. The seal as recited in claim 6 wherein the seal body includes a first annular projection extending generally axially from the seal body first end and providing at least a portion of the radial sealing surface and a second annular projection extending generally radially inwardly from the seal inner surface and providing at least a portion of the circumferential sealing surface.

13. An assembly comprising:
first and second members spaced apart along an axis so as to define an axial space having a width, the first member having a generally radial surface and the second member having an outer circumferential surface and a radial end surface extending radially to the outer circumferential surface, the second member being one of coupled with the first member and disposed about a third member coupled with the first member; and
a seal for sealing the axial space and including a generally annular seal body having inner and outer circumferential surfaces, opposing first and second axial ends, a radial sealing surface proximal to the first axial end and configured to sealingly engage with the first member radial surface, and a circumferential sealing surface proximal to the second axial end and configured to sealingly engage with the second member outer surface such that the seal body encloses the second member radial end surface, at least a portion of the seal body extending circumferentially about and enclosing the axial space, the seal body being configured to be non-contactable with the enclosed second member radial end surface, the seal body being further configured such that the seal inner surface overlaps a first length of the second member outer surface when the axial space has a first width and to alternatively overlap a second length of the second member outer surface when the axial space has a second width, the second length being greater than the first length when the first width is greater than the second width.

* * * * *